United States Patent [19]

Koreltz et al.

[11] Patent Number: 5,637,559
[45] Date of Patent: Jun. 10, 1997

[54] FLOOR STRIPPING COMPOSITION AND METHOD

[75] Inventors: Francis J. Koreltz, St. Paul; James A. McDonell; Fidelis C. Onwumere, both of Woodbury, all of Minn.; Toshihiro Funabiki, Yokohamra, Japan

[73] Assignee: Minnesota Mining and Manufacturing Company, St. Paul, Minn.

[21] Appl. No.: 341,709

[22] Filed: Nov. 18, 1994

Related U.S. Application Data

[63] Continuation of Ser. No. 40,368, Mar. 30, 1993.

[51] Int. Cl.$^6$ .................... C11D 1/92; C11D 1/83
[52] U.S. Cl. .............. 510/201; 510/212; 510/206
[58] Field of Search .................... 252/162, 170, 252/171, 174.25, 165, DIG. 14

[56] References Cited

U.S. PATENT DOCUMENTS

| | | | |
|---|---|---|---|
| 2,710,843 | 6/1955 | Stebleton | 252/158 |
| 2,901,433 | 8/1959 | Spring | 252/118 |
| 2,929,789 | 3/1960 | Pickett et al. | 51/295 |
| 2,958,593 | 11/1960 | Hoover et al. | 260/584 |
| 3,202,714 | 8/1965 | Zimmerer et al. | 252/110 |
| 3,367,878 | 2/1968 | Mankowich | 252/10 |
| 3,463,735 | 8/1969 | Stonebraker et al. | 252/187 |
| 3,553,144 | 1/1971 | Murphy | 252/158 |
| 3,615,827 | 10/1971 | Murphy | 134/38 |
| 3,634,338 | 1/1972 | Laugle et al. | 252/525 |
| 3,664,962 | 5/1972 | Kelly et al. | 252/125 |
| 3,696,043 | 10/1972 | Labarge et al. | 252/153 |
| 3,806,460 | 4/1974 | Mukai et al. | 252/111 |
| 3,872,021 | 3/1975 | McKnight | 252/121 |
| 3,882,038 | 5/1975 | Clayton et al. | 252/164 |
| 3,917,850 | 11/1975 | Boucher | 424/333 |
| 3,939,090 | 2/1976 | Zmoda | 252/90 |
| 3,948,819 | 4/1976 | Wilde | 252/545 |
| 4,013,607 | 3/1977 | Dwyer et al. | 260/29.6 |
| 4,017,409 | 4/1977 | Demessemaekers et al. | 252/109 |
| 4,040,977 | 8/1977 | Eggensperger et al. | 252/401 |
| 4,144,201 | 3/1979 | Winterbotham et al. | 252/547 |
| 4,174,304 | 11/1979 | Flanagan | 252/524 |
| 4,175,062 | 11/1979 | Disch et al. | 252/540 |
| 4,203,872 | 5/1980 | Flanagan | 252/542 |
| 4,225,471 | 9/1980 | Claus et al. | 252/547 |
| 4,235,734 | 11/1980 | Scherubel | 252/142 |
| 4,240,919 | 12/1980 | Chapman | 252/95 |
| 4,254,104 | 3/1981 | Suzuki | 424/170 |
| 4,264,466 | 4/1981 | Carleton et al. | 252/99 |
| 4,264,729 | 4/1981 | Beljanski | 435/6 |
| 4,297,251 | 10/1981 | Bernardino | 252/545 |
| 4,348,292 | 9/1982 | Ginn | 252/90 |
| 4,414,128 | 11/1983 | Goffinet | 252/111 |
| 4,460,374 | 7/1984 | Abel et al. | 8/501 |
| 4,501,680 | 2/1985 | Aszman et al. | 252/142 |
| 4,552,685 | 11/1985 | Kernstock et al. | 252/355 |
| 4,561,991 | 12/1985 | Herbots et al. | 252/118 |
| 4,606,842 | 8/1986 | Keyes et al. | 252/174.23 |
| 4,606,850 | 8/1986 | Malik | 252/528 |
| 4,673,523 | 6/1987 | Smith et al. | 252/91 |
| 4,726,915 | 2/1988 | Verdicchio | 252/547 |
| 4,741,863 | 5/1988 | Yamamoto et al. | 252/547 |

(List continued on next page.)

FOREIGN PATENT DOCUMENTS

| | | |
|---|---|---|
| 9100337 | 1/1991 | European Pat. Off. . |
| 2571279 | 4/1986 | France . |
| 2582546 | 12/1986 | France . |
| 52-77111 | 6/1977 | Japan . |
| 54-14406 | 2/1979 | Japan . |
| 56-22397 | 3/1981 | Japan . |
| 57-28199 | 2/1982 | Japan . |
| 57-83598 | 5/1982 | Japan . |
| 58-185700 | 10/1983 | Japan . |
| 59-70652 | 4/1984 | Japan . |
| 1602234 | 5/1978 | United Kingdom . |
| 2166153 | 10/1985 | United Kingdom . |
| WO91/00336 | 10/1991 | WIPO .............. C11D 3/44 |

OTHER PUBLICATIONS

"Ethers for Household and Institutional Products", published 1976) No Month Available.

International Speciality Products product literature "Surfadone LP Specialty Solvents and Surfactants", 1992 No Month Available.

ARCO Chemical Company trade literature "Introducing ARCOSOLV PTO Solvent".

"Solvent Formulations From Eastman Chemicals", Sep. 1983.

Exxon Chemical Company product literature "AO-14-2", Dec. 4, 1991.

Exxon Chemical Company product literature "Non-Butyl Cleaners", Dec. 1980.

Exxon Chemical Company, "1992 Formulary" No Month Available.

"Household and Personal Products Industry," May 1982, pp. 48-54.

*Primary Examiner*—Douglas J. McGinty
*Assistant Examiner*—Necholus Ogden
*Attorney, Agent, or Firm*—Gary L. Griswold; Walter N. Kirn; Daniel R. Pastirik

[57] ABSTRACT

The present invention is drawn toward compositions and methods of using same, the compositions comprising (in diluted form):

a) an effective amount of a phenyl substituted alkyl alcohol having a water solubility of at least 0.1 weight percent (preferably benzyl alcohol);

b) a coupler; and c) water, wherein the amount of the coupler is at least 3.0 times the amount necessary to completely solubilize the phenyl substituted alkyl alcohol in the water. Preferred couplers are the salt of a monofunctional water-soluble amine and an organic acid comprising at least one water-insoluble organic acid having from 6–10 carbon atoms. Methods of removing coatings such as standard urethane/acrylic sealer finishes from floors using the inventive compositions are also described.

7 Claims, No Drawings

U.S. PATENT DOCUMENTS

| | | | |
|---|---|---|---|
| 4,749,509 | 6/1988 | Kacher | 252/139 |
| 4,758,377 | 7/1988 | Iding et al. | 252/556 |
| 4,767,563 | 8/1988 | Buzzaccarini | 252/174.25 |
| 4,769,172 | 9/1988 | Siklosi | 252/153 |
| 4,790,951 | 12/1988 | Wittpenn, Jr. et al. | 252/547 |
| 4,814,109 | 3/1989 | Frieser et al. | 252/162 |
| 4,863,629 | 9/1989 | Osberghaus et al. | 252/162 |
| 4,891,147 | 1/1990 | Gray et al. | 252/104 |
| 4,909,962 | 3/1990 | Clark | 252/547 |
| 4,927,556 | 5/1990 | Pokorny | 252/173 |
| 4,931,726 | 6/1990 | Kasukabe et al. | 324/158 |
| 5,019,289 | 5/1991 | Gray et al. | 252/95 |
| 5,080,822 | 1/1992 | VanEenam | 252/170 |
| 5,080,831 | 1/1992 | VanEenam | 252/558 |
| 5,093,031 | 3/1992 | Login et al. | 252/387 |
| 5,126,068 | 6/1992 | Burke et al. | 252/174.21 |
| 5,158,710 | 10/1992 | Van Eenam | 252/539 |
| 5,396,445 | 3/1995 | Michael et al. | 252/548 |

FLOOR STRIPPING COMPOSITION AND METHOD

This is a continuation of application Ser. No. 08/040,368 filed Mar. 30, 1993.

BACKGROUND OF THE INVENTION

1. Brief Description of the Invention

The present invention is drawn toward compositions and methods of using compositions to strip (i.e. remove) coatings such as standard floor finishes and/or greasy residues from hard surfaces such as floors. 2. Related Art Various concentrated and ready-to-use compositions are available for stripping floor finishes and/or greasy residues from surfaces such as floors, counter tops, and other surfaces. U.S. Pat. No. 5,080,831 describes aqueous cleaner/degreaser compositions comprising an organic solvent, a solubilizing additive consisting of a surfactant and a coupler and balance water. Organic solvents claimed as being useful in the '831 patent are described as being sparingly water-soluble, having a water solubility ranging from approximately 0.2 to approximately 6 weight percent in water, such as benzyl alcohol. Compositions within the '831 patent claims include a solubilizing additive present in an amount not exceeding approximately twofold that required to completely solubilize the organic solvent. Among other criteria, the organic solvent cannot be a hydrocarbon. U.S. Pat. No. 5,158,710 of the same assignee as the '831 patent describes similar compositions, some of the compositions useful as floor strippers.

U.S. Pat. No. 4,414,128 describes liquid detergent compositions which comprise a terpene (a hydrocarbon), a surfactant, a polar solvent such as benzyl alcohol, and water. Terpenes described as being useful in these compositions include hydrocarbon terpenes and terpene alcohols.

In light of the above-described compositions, one would expect that compositions comprising sparingly water-soluble organic solvents and a coupler, with the coupler concentration substantially above twofold times that necessary to completely solubilize the organic solvent would not be effective in removing floor finishes and the like from surfaces, especially in the presence of a hydrocarbon.

SUMMARY OF THE INVENTION

Contrary to the teachings of the art, the inventors herein have discovered that compositions containing at least one of a select class of slightly water-soluble organic solvents and a coupler, wherein the coupler is present at greater than 2.0 times that required to completely solubilize the solvent, are surprisingly extremely efficient in removing standard floor finishes from various hard surfaces. In particular, the compositions of the present invention show a remarkable ability to remove multiple coatings of a standard floor coating comprising a urethane polymer-based sealer and an acrylic polymer-based finish from floors and/or base boards. Compositions within the invention have also found use in removing ink from hard surfaces.

In accordance with the present invention, the inventors herein have surprisingly discovered that compositions suitable for stripping coatings (i.e., removing at least a portion of the coating) from a surface, preferably after being diluted with water, especially greasy residues and floor finishes from floors such as vinyl tile floors, terrazzo, marble, and the like, may be formulated comprising:

a) an effective amount of a phenyl substituted alkyl alcohol having a water solubility of at least 0.1 weight percent (preferably benzyl alcohol); and b) a coupler, wherein the amount of the coupler is present in an amount which is at least 3.0 times the amount necessary to completely solubilize the phenyl substituted alkyl alcohol.

"Diluted with water" as used herein means the inventive compositions are reduced in actives concentration by adding from 0.1 part to 30 parts water per part of inventive composition. Specific dilution ratios are dependent on the end use, and examples are given herein below.

"Effective amount" when referring to the phenyl substituted alkyl alcohol means that it is present in an amount which removes at least 10 percent of a standard urethane/acrylic floor sealer/finish from a composition vinyl tile within 2.5 minutes, in accordance with a standard test (see Test Methods section).

As used herein the term "coupler" refers to a compound or a physical or chemical combination of compounds having the capability of increasing the phase-stability of the compositions of the invention. Couplers typically and preferably comprise low molecular weight (molecular weights less than about 500) organic compounds. The term "hydrotrope" is also frequently used interchangeably with coupler. One preferred coupler for use in the invention is the reaction product of monoethanolamine with an organic acid comprising n-octanoic acid and n-decanoic acid.

Preferred compositions also include an effective amount of a surfactant and an effective amount of a chelating agent. Typically the surfactant, preferably a low-foaming fluorochemical surfactant, is present at a weight ratio of surfactant to phenyl substituted alkyl alcohol of about 0.005:1. Chelating agents may be preferred when the compositions are to be stored in containers and then dispensed after prolonged storage to avoid precipitation of coupler. Preferred chelating agents include 1-hydroxyethylidene-1, 1-diphosphonic acid, and the like, present at a weight ratio of chelating agent to phenyl substituted alkyl alcohol ranging from about 0,005:1 to about 0,015:1.

The compositions of the invention are substantially more effective in removing multiple coatings of a standard floor sealer/finish comprising urethane/acrylic polymers than the previously described patented compositions, as shown in the Examples.

It has also been discovered that compositions of the invention further containing a terpene, such as d-limonene, although less effective than compositions of the invention devoid of a hydrocarbon terpene, remove a standard floor sealer/finish comprising urethane/acrylic polymers more effectively than the earlier discussed patented compositions. The presence of the terpene also serves to dissolve hydrophobic materials typically deposited on these coatings, and affords pleasant odor.

Another aspect of the invention is a method of removing a sealer/finish coating from a surface, the method comprising:

a) applying to the coating a composition within the invention; and b) allowing the composition to contact the coating for a time sufficient to at least partially remove the coating. As used herein "coating" is meant to include a single layer or multiple layers of the same composition, and coatings comprising two or more layers, each layer comprising dissimilar compositions.

Preferred methods comprise abrading the coating after a predetermined contact time between the coating and the composition, such as with a lofty, open, three dimensional nonwoven pad, such as those described in U.S. Pat. No. 2,958,593, which is attached to a conventional floor maintenance machine. Alternatively, the composition may be applied and removed using a natural or synthetic fiber-based cloth, such as a cotton or synthetic cloth.

Further aspects and advantages of the invention will become apparent from the description of the preferred embodiments which follows.

DESCRIPTION OF PREFERRED EMBODIMENTS

The compositions of the present invention are especially useful in stripping urethane sealants, acrylic floor finishes, and urethane/acrylic "sealer/finishes" from flooring materials such as composition vinyl tiles, marble, terrazzo, and the like. The compositions of the invention may also be employed in stripping grease, oil, and the like, from similar surfaces such as floors in restaurants, homes, automobile repair facilities, and the like. The various ingredients of the compositions of the invention will now be discussed in more detail.

Phenyl Substituted Alkyl Alcohols

Phenyl substituted alkyl alcohols function as the coating dissolving and/or grease solubilizing component of the compositions of the invention. Phenyl substituted alkyl alcohols useful in the present invention have a water solubility of at least about 0.1 weight percent, more preferably ranging from about 0.2 to about 6 percent by weight in water at 20° C. Organic solvents having a water solubility ranging from about 0.2 to about 6 weight percent are commonly referred to in the art as "sparingly" or "slightly" water-soluble organic solvents.

Phenyl substituted alkyl alcohols useful in the invention include benzyl alcohol, alpha-phenylethyl alcohol, beta-phenylethyl alcohol, ethylene glycol benzyl ether, and the like. One particularly preferred phenyl substituted alkyl alcohol which is slightly water-soluble is benzyl alcohol, due to its solvent properties, relatively low toxicity, availability, and because it is relatively nonhazardous to transport. It also has not unpleasant odor.

Phenyl substituted alkyl alcohols in which the phenyl group is also substituted, for example with $C_1$ –$C_4$ alkyl groups, may be useful in the invention, provided they have the requisite water-solubility.

In addition to the water solubility criteria mentioned above, and as previously mentioned, it is also desirable but not essential that the phenyl substituted alkyl alcohols useful in the invention have a relatively low volatility or high flash point (in excess of 60° C.), exhibit a low level of odor, be chemically stable, nontoxic, nonhazardous and commercially available.

The phenyl substituted alkyl alcohol is preferably present in the composition in an amount sufficient to remove the coating to which it is applied, the amount varying with the coating or residue to be removed. Compositions within the invention preferably have the following weight ratios of active ingredients:

Phenyl substituted alkyl alcohol to coupler, from 1:2 to 1:1, preferably 4:6;

Phenyl substituted alkyl alcohol to surfactant, about 0.005:1;

Phenyl substituted alkyl alcohol to chelating agent, from about 0,005:1 to about 0.02:1.

For particularly heavy greasy residues or old, multiple surface coatings, the weight percentage of phenyl substituted alkyl alcohol in the ready-to-use composition may be as high as 10 weight percent. If a less aggressive composition is desired, one may dilute the concentrates so that the weight percentage of phenyl substituted alkyl alcohol is as low as 1.0 weight percent. A preferred ready-to-use composition includes from about 2.5 to about 4.5 wt % alcohol. These concentrations of alcohol may be obtained by diluting the concentrates listed in Table A with from 8 to 15 parts by weight water as in the Examples. When the concentrates mentioned in Table A are diluted to about 1 part concentrate to 4 parts water, the diluted version may find use as a sprayable cleaner. Trigger-spray devices are known in the art and not considered a part of this invention. The 1:4 diluted compositions of the invention may also be formulated as an aerosol. The concentrates of Table A may be used as an ink remover, or remover of similar compositions.

TABLE A

| Ingredient | Concentrate 1 | Concentrate 2 |
|---|---|---|
| Benzyl alcohol | 39.9 | 37.9 |
| MEA | 33.9 | 33.9 |
| n-octanoic acid | 25.0 | 25.0 |
| FC-135 | 0.20 | 0.20 |
| dye | 0.50 | 0.50 |
| chelating agent | 0.50 | 0.50 |
| d-limonene | — | 2.00 |

When the weight percentage of phenyl substituted alkyl alcohol is less than about 1 weight percent, compositions within the invention may not have the requisite cleaning power to remove greasy residues or surface finishes in user acceptable times. When the concentration of the phenyl substituted alkyl alcohol is over about 10 weight percent in ready-to-use compositions, there does not appear to be any beneficial effect over that observed for 10 weight percent compositions, except when used, for example, as an ink remover. When used as an ink remover, the concentration of phenyl substituted alkyl alcohol may be as high as 40 weight percent.

Couplers

Couplers function to increase the phase stability of the composition by increasing the apparent water solubility of the alcohol. Suitable couplers for use in the compositions of the present invention include the salt of a low molecular weight monofunctional amine and a low molecular weight organic acid. Couplers of this nature allow higher concentration of the phenyl substituted alkyl alcohol than other coupling/emulsifying agents frequently used in the art. Particularly preferred monofunctional amines include water-soluble organic amines such as monoethanolamine (MEA), 2-aminomethylpropanol (AMPS), and other n-alkyl substituted derivatives of these.

Preferred low molecular weight acids include $C_6$–$C_{10}$ water-insoluble organic monoacids such as n-octanoic acid and the like. One preferred acid is that known under the trade designation "Emery" 658, available from Emery Chemical Company, which is a combination of n-octanoic and n-decanoic acids.

Other compounds which may be used as couplers to increase the apparent water solubility of the phenyl substituted alkyl alcohol include glycol ethers such as ethylene glycol benzyl ether.

Couplers are present in ready-to-use compositions of the invention such that the amount of the coupler is always greater than or equal to about 3.0 times that required to fully solubilize the phenyl substituted alkyl alcohol. In the case where the coupler is the combination of monoethanolamine and n-octanoic acid, the weight ratio of monoethanolamine to n-octanoic acid typically and preferably ranges from about 3:1 to about 1:1.

A determination of how much coupler to add so that the amount of coupler is at or exceeds 3.0 times the minimum amount necessary to fully solubilize the phenyl substituted alkyl alcohol is easily performed by visual inspection of compositions containing various ratios of coupler to alcohol. Greater amounts of coupler may decrease cleaning performance or coating removal efficiency of the compositions of the invention, and may be uneconomical.

Hydrocarbon Terpenes

One class of useful compositions within the present invention (although not particularly preferred) are compositions comprising a phenyl substituted alkyl alcohol such as benzyl alcohol, a coupler such as the reaction product of MEA with a combination of n-octanoic and n-decanoic acid, a hydrocarbon solvent such as a hydrocarbon terpene, and water. Hydrocarbon terpenes may afford the compositions within the invention grease dissolving power, and may provide more pleasant odor.

Hydrocarbon terpenes useful in this class of compositions include the class of mono- or sesquiterpenes or mixtures thereof and can be acyclic or preferably monocyclic or bicyclic in structure. It is preferably liquid at room temperature (250° C.). Examples of acyclic hydrocarbon terpenes suitable for use herein include 2-methyl- 6-methylene-2, 7-octadiene and 2, 6-dimethyl-2,4,6-octadiene. Preferred monocyclic terpene hydrocarbons belong to the terpinene, terpinolene, and limonene classes, for example the alpha, beta, and gamma terpinenes, the d and 2-limonenes and dipentene (essentially a limonene racemate). The limonenes occur naturally in certain fruit and vegetable essences. Preferred bicyclic terpene hydrocarbons include alpha and beta-pinene. Especially preferred is the hydrocarbon terpene d-limonene. The hydrocarbon terpene may be added to the compositions of the invention at a level of about 0.5 to about 5.0 weight percent, more preferably from about 0.5 to 3.0 weight percent.

Surfactants and Optional Ingredients

Optional ingredients are those typically used in cleaning and floor maintenance products, such as surfactants, fragrances and dyes. A surfactant may be required when the user desires to quickly strip a coating from a large surface. If a surfactant is used, the surfactant is preferably a low-foaming surfactant such as the low-foaming cationic fluorochemical surfactant known under the trade designation "FC-135" and the like, available from Minnesota Mining and Manufacturing Company, St. Paul, MN ("3M").

Other surfactants such as sodium 1-octane sulfonate, sodium dodecylbenzene sulfonate, sodium tallowate, and sodium xylene sulfonate are less efficient at coupling benzyl alcohol and other phenyl substituted alkyl alcohol solvents into solution than couplers derived from a water soluble organic amine and a water insoluble organic acid.

It may be advantageous to include a compatible thickening agent to render the viscosity of the compositions of the invention such that they may be applied to a vertical surface, e.g., a base board, and not run therefrom. If such running occurs, the residence time of the composition with respect to the surface being cleaned should be reduced or the composition may run onto areas where it is not wanted. It has been found in practice with other compositions outside of the invention that colloidal magnesium aluminum silicate (sold under the trade designation "Veegum" T) is a suitable thickening agent. This particular thickening agent is typically effective at a concentration of about 0.3 to about 0.6 percent by weight of total composition, but this concentration may vary with other thickening agents.

In use, the compositions of the invention may be sprayed as an aerosol or non-aerosol upon the surface to be cleaned, or simply poured thereon. Spraying can be accomplished by conventional mechanical spraying devices or by using an aerosol dispensing container with a sufficient amount of suitable aerosol propellant such as a low boiling alkanes or mixtures thereof, such as a mixture isobutane and propane.

Method Of Removing Greasy Residues and/or Floor Coatings From Surfaces

The invention also pertains to a method of removing coatings from a surface, the method comprising:

a) applying to the coating a composition comprising:
   i) an effective amount of a phenyl substituted alkyl alcohol having a water solubility of at least 0.1 weight percent;
   ii) a coupler; and
   iii) water,
wherein the amount of the coupler is at least 3.0 times the amount necessary to completely solubilize the phenyl substituted alkyl alcohol; and b) allowing the composition to contact the coating for a time sufficient to at least partially remove the coating.

A preferred method of removing coatings from a surface comprises:

a) applying to the coating a composition comprising:
   i) an effective amount of benzyl alcohol;
   ii) a coupler comprising the salt of a water-soluble organic amine and a water-insoluble organic acid; and
   iii) water,
wherein the amount of the coupler is at least 3.0 times the amount necessary to completely solubilize the benzyl alcohol; and b) allowing the composition to contact the coating for a time sufficient to at least partially remove the coating.

In the methods of the invention, the compositions of the invention may be applied with a mop, poured onto the surface to be cleaned or stripped. The compositions may also be applied by conventional floor maintenance machines, or they may be sprayed as an aerosol or non-aerosol upon the surface to be cleaned. Spraying can be accomplished by conventional mechanical spraying devices or by using an aerosol dispensing container with a sufficient amount of suitable aerosol propellant such as a low boiling alkanes or mixtures thereof, such as a mixture isobutane and propane.

Further understanding of the compositions and methods of the invention will be understood with reference to a following examples wherein all parts and percentages are by weight unless otherwise specified.

EXAMPLES

Examples 1–7 and Comparative Examples A–H

The concentrated compositions of Table A above were diluted with water at the dilutions indicated in Table 1 to formulate the compositions of Examples 1–7. The compositions of Comparative Examples A–H were formulated in accordance with the teaching of Examples 2, 3, 6, 7, 8, 9, 10, and 11, respectively, of U.S. Pat. No. 5,158,710, and are provided in Table 2 below.

The compositions of Examples 1–7 and Comparative Examples A–H were tested to determine their proficiency in removing 10 coats of a commercially available urethane sealant/acrylic finish from a composition vinyl tile strip, the sealant/finish available from Buckeye International, Inc., St. Louis, Mo., under the trade designation "Citation."

To make the coated strips used in the test, a 30.5 cm. ×30.5 cm composition vinyl tile was coated with 10 coats of the sealant/finish and then cut into 2.5 cm ×15 cm strips. The coated tiles in each case were then put in an oven for 3 days at 49° C. to allow the coatings to fully harden, and thus simulate aged and burnished finish.

The compositions of Examples 1–7 and Comparative Examples A–H were tested individually by immersing coated strips for 2.5 minutes in a 100 ml beaker filled with 90 ml of each composition so that the test strips did not touch the inside or the bottom of the beaker. The composition in each case was agitated mildly with a magnetic stirrer set at 5 on a scale of 10. After 2.5 minutes, the tiles were removed and wiped lightly with a mohair cloth so that the final thickness ($T_f$) of the tile plus residual coating could be measured. Tables 1 and 2 tabulate the results of the dip tests, where "% removed" was calculated by the equation: $100 \times (1 - T_f/T_i)$, where $T_i$ was the initial thickness of the coated tile (i.e., coating plus tile thickness).

It can be seen from the data in Tables 1 and 2 that the compositions of the invention (Examples 1–7) were more effective in the test than the Comparative Example compositions A–H. The compositions of Examples 1–3 (devoid of hydrocarbon terpene) were more effective in this test than the compositions of Examples 4–7.

Various modifications of the invention will be apparent to those skilled in the art. The examples and description are intended to support and enable the following claims, and are not intended to limit the scope thereof.

TABLE 1

Inventive Compositions 1–7

| Concentrate From Table A | Dilution Ratio | Example Designation | Wt. % Solvent | % Removed |
|---|---|---|---|---|
| Concentrate #1 | 1:15 | 1 | 2.49 | 88 |
| | 1:11 | 2 | 3.33 | 92 |
| | 1:10 | 3 | 3.63 | 90 |
| Concentrate #2 | 1:8 | 4 | 4.43 | 87 |
| | 1:8 | 5 | 4.21 | 85 |
| | 1:10 | 6 | 3.45 | 67 |
| | 1:11 | 7 | 3.16 | 75 |

TABLE 2

Comparative Examples A–H

| Wt. % Ingred. | A | B | C | D | E | F | G | H |
|---|---|---|---|---|---|---|---|---|
| Dowanol PPH | 3.00 | 3.50 | 4.00 | 4.00 | 4.00 | 4.00 | 4.00 | 4.00 |
| MEA | 1.8 | 0.5 | 0.05 | 1.5 | 0.9 | 1.5 | 1.5 | 1.5 |
| Sodium metasilicate | 1.5 | 1.2 | 1.0 | 0 | 0.4 | 0.4 | 0.4 | 0.5 |
| Witco 1298 | 1.0 | 1.2 | 1.5 | 1.7 | 1.7 | 1.7 | 1.6 | 1.6 |
| Witconate SXS (40%) | 0 | 5.0 | 5.0 | 0 | 0 | 0 | 0 | 0 |
| DI water | 92.7 | 88.6 | 87.8 | 92.3 | 92.6 | 91.9 | 92.1 | 92 |
| NaOH (50%) | 0 | 0 | 0.2 | 0.5 | 0.4 | 0.5 | 0.4 | 0.4 |
| % Removed | 49 | 41 | 18 | 51 | 46 | 61 | 44 | 52 |

What is claimed is:

1. A composition suitable for stripping coatings from a surface when diluted with water, the composition consisting essentially of:

a) 1–40% by weight of benzyl alcohol effective in removing at least 10 percent of a standard urethane/acrylic floor sealer/finish from a composition vinyl tile in 2.5 minutes; and b) a coupler comprising a salt formed from a water soluble organic amine and an acid comprising at least one $C_6$–$C_{10}$ water-insoluble monocarboxylic acid, said coupler and said benzyl alcohol present in a weight ratio of said alcohol to said coupler within the range from 1:2 to 1:1, wherein the amount of the coupler is at least 3.0 times the amount necessary to completely solubilize the benzyl alcohol c) optionally water.

2. Composition in accordance with claim 1 wherein said water-soluble organic amine is monoethanolamine.

3. Composition in accordance with claim 1 wherein said water-soluble organic amine is 2-aminomethylpropanol.

4. Composition in accordance with claim 3 wherein said at least one water-insoluble organic acid comprises n-octanoic acid and n-decanoic acid.

5. Composition in accordance with claim 1 which further comprises a hydrocarbon terpene.

6. Composition in accordance with claim 5 wherein the hydrocarbon terpene is d-limonene.

7. A method of removing coatings from a surface, the method comprising:

a) applying to the coating a composition consisting essentially of i) 1–40% by weight of benzyl alcohol present in an amount which is effective in removing at least 10 percent of a standard urethane/acrylic floor sealer/finish from a composition vinyl tile in 2.5 minutes;

ii) a coupler comprising a salt formed from a water soluble organic amine and an acid comprising at least one $C_6$–$C_{10}$ water-insoluble monocarboxylic acid, said coupler and said benzyl alcohol present in a weight ratio of said alcohol to said coupler within the range from 1:2 to 1:1; and iii) optionally water, wherein the amount of the coupler is at least 3.0 times the amount necessary to completely solubilize the benzyl alcohol in said water; and b) allowing the composition to contact the coating for a time sufficient to at least partially remove the coating.

* * * * *